E. TRIMM.
SIGNALING DEVICE FOR VEHICLES.
APPLICATION FILED JUNE 11, 1918.

1,366,041.

Patented Jan. 18, 1921.
2 SHEETS—SHEET 1.

Witness:
C. M. Schweiger

Edward Trimm,
Inventor.
By Emil Neuhart,
Attorney.

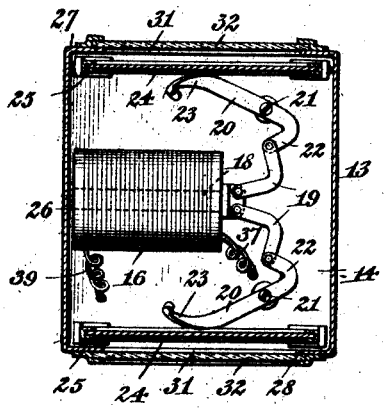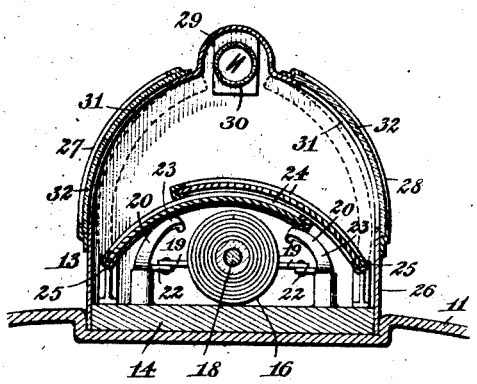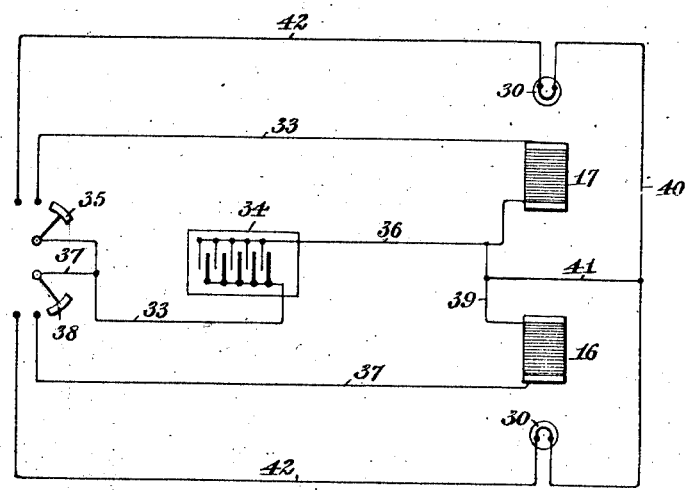

UNITED STATES PATENT OFFICE.

EDWARD TRIMM, OF BUFFALO, NEW YORK.

SIGNALING DEVICE FOR VEHICLES.

1,366,041.  Specification of Letters Patent.  Patented Jan. 18, 1921.

Application filed June 11, 1918. Serial No. 239,379.

*To all whom it may concern:*

Be it known that I, EDWARD TRIMM, a citizen of the United States, residing at Buffalo, in the county of Erie and State of New York, have invented certain new and useful Improvements in Signaling Devices for Vehicles, of which the following is a specification.

My invention relates to improvements in signaling devices for vehicles to warn vehicles in rear of the course which the operator is to travel.

The primary object of my invention is the provision of a signaling device for vehicles which is simple, compact, and easily operated, and which will indicate to occupants of vehicles in rear of the intention of the operator of the vehicle having such signals thereon to deviate from a straight course, to diminish the speed of the vehicle, or to stop.

A further object is to provide a signaling device of this type which has a pair of signals operated by a single member and adapted to indicate from both the front and rear the intention to turn, to diminish the speed of the vehicle, or to stop the vehicle.

A still further object of my invention is to provide a signaling device having signaling members adapted to be moved electrically from normal to signaling position and being arranged to return to normal position by gravity when released from signaling position.

With these and other objects in view the invention consists in the novel features of construction and in the arrangement and combination of parts to be hereinafter described and particularly pointed out in the subjoined claims.

In the drawings:—

Fig. 5 is a section similar to Fig. 4 showing the signal members in signaling position.

Fig. 6 is a longitudinal section taken on line 6—6, Fig. 3.

Fig. 7 is a diagrammatic view of the circuit wires in which the solenoids of the device and the incandescent lamps are included.

Reference being had to the drawings in detail, similar numerals refer to similar parts in the several figures.

Figure 1:
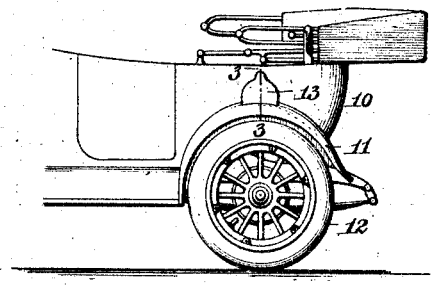
Figure 1 is a side elevation of the rear end of an automobile, showing the same equipped with my improved signaling device.
Figure 2:
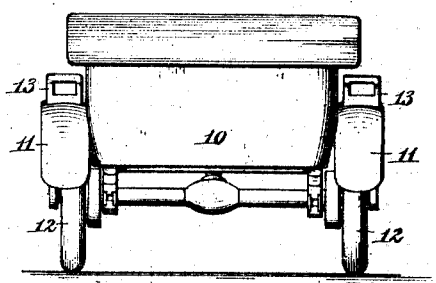
Fig. 2 is a rear end view of the automobile.
Figure 3:
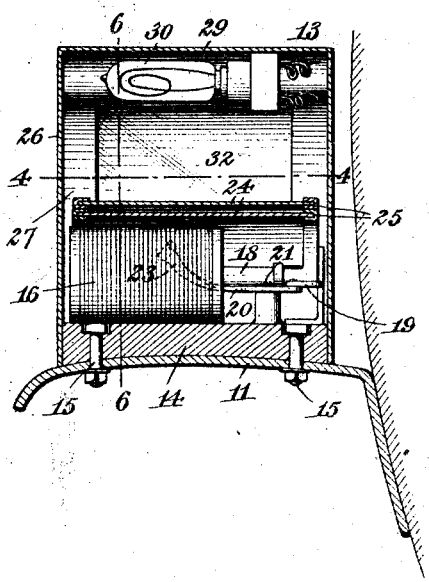
Fig. 3 is an enlarged transverse section taken on line 3—3, Fig. 1.
Figure 4:
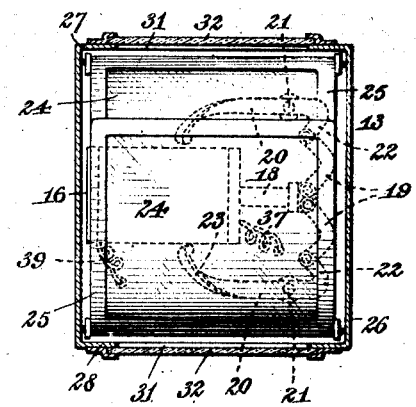
Fig. 4 is a horizontal section taken on line 4—4, Fig. 3, showing the signal members in normal position.

The reference numeral 10 designates the automobile having the usual fenders 11 arranged over the rear or driving wheels 12. On each of these fenders one of my improved signaling devices 13 is attached. When operating the device mounted on the right hand rear fender, a signal is given of the intension of the operator of the automobile to turn to the right; while when the device mounted on the rear left hand fender is operated, a signal is given of the intention to turn to the left. If it should be desired to warn vehicles in the rear of the intention of the operator to considerably diminish the speed of the vehicle or to stop the same, both devices may be operated.

Each device comprises a suitable base 14 which is conveniently secured by means of bolts 15, or otherwise, to the fender on which the device is mounted, and fastened to said bases are solenoids 16, 17, each having a core 18 slidable therein.

Pivotally secured to the outer end of the core of each solenoid is a pair of elbow levers 19 disposed in opposite direction from their points of attachment to said core, and 20 designates a pair of actuating levers pivotally secured between their ends, as at 21, to the base 14, one end of each lever having an inwardly-directed arm 22 which is pivotally connected to the outer end of the adjacent elbow lever 19, the inner end of each of said actuating arms being curved upwardly, as at 23, and being free for action.

24 designates a pair of signal flaps or members which are pivotally connected at their lower or outer ends to the base 14, each of said flaps or members being curved and normally overlying one another above the solenoid, as clearly shown in Fig. 6. These flaps or signals are so arranged and mounted that they return to normal or non-signaling position by gravity when the electric current having operated them is cut off. Each of these flaps comprise a suitable metallic or other frame 25 in which a sheet of colored celluloid is held, the celluloid by preference being yellow, since it is considered that this color is seen from a greater distance than any other.

The inner ends of the actuating levers lie in contact with said signal flaps or members and are adapted to hold said flaps or members elevated from the solenoid, as clearly shown in Fig. 6.

26 designates a casing which fits over the base 14 and is adapted to confine the operating parts of the device and allow the signal or members free action therein. The front and rear sides of this casing are curved to conform to the curvature of the signal flaps or members, as shown at 27, 28, Fig. 6, and these curved sides are connected at their upper ends by a substantially semi-cylindrical dome or bonnet 29 in which an incandescent lamp 30 is located. The front and rear sides 27, 28, respectively, of the casing are provided with openings 31 which are fitted with glass or other transparent material 32.

The solenoid 17 of the device mounted on the right hand rear fender of the automobile has a conductor 33 connected therewith, said conductor leading to one of the terminals of a storage cell or battery 34 and having a two-point switch 35 therein. From said solenoid a conductor 36 leads to the opposite terminal of said storage cell or battery, thus completing a circuit which includes said solenoid and which circuit is established or broken by the said switch. The solenoid 16 of the device mounted on the left hand rear fender has a conductor 37 connected therewith which leads to and is connected to the conductor 33, and in said conductor 37 a two-point switch 38 is included. A conductor 39 connects the solenoid 16 with the conductor 36 and therefore when the switch 38 is closed a circuit is established through the conductor 33, the conductor 37 including the switch 38, through the solenoid 16, the conductor 39, and the conductor 36. The solenoids 16 and 17 are therefore respectively energized upon closing the switches 38 and 35.

Each of the incandescent lamps 30 has a conductor 40 connected thereto which has connection through a conductor 41, with the conductor 39 leading to the battery through a portion of the conductor 36. Each of said lamps has a conductor 42 leading therefrom, the conductor of the device at the right having connection with one of the terminals of the switch 35 and the conductor of the device at the left having connection with one of the terminals of the switch 38. The movable element of each switch 35, 38, has an extended contact so that it may close the current including the coöperating solenoid, or both the current of said solenoid and the coöperating lamp.

While the arrangement of wiring shown is now believed to be best adapted for the purpose of controlling the solenoids and lamps of the devices, any other arrangement of wiring may, however, be substituted so long as the solenoids at each side, or both, may be operated independent of the lamps or with the lamps, as may be desired.

When operating the device during the day, the switches are operated separately or together so that they establish connection between the wires 33, 37, thereby placing the solenoid of one or both circuits into action, depending on whether one or both switches are operated.

When actuating the device at night, the switches are operated in a manner to cause the movable elements thereof to make contact with the terminals to which the conductors 42 are connected, while in contact with the terminals to which the conductors 33 and 37 are connected, thus placing both the solenoids and the lamps in circuit and therefore illuminating the device when actuating the same.

When the solenoid of either device is energized, the core therefore is drawn inwardly, which causes the actuating levers 20 to be swung on their pivots, the inner ends of said actuating levers moving outwardly while in contact with the signal flaps or members and causing said flaps or members to swing upwardly and outwardly into contact with the inner sides of the front and rear curved walls 27, 28, said flaps or members being colored are thus exposed through the openings 31. The signal is therefore visible from the front and rear of the car and if given at the right of the car indicates that a turn is to be made toward the right, while if given at the left side of the car, that a turn is to be made toward the left.

The closing of both switches at the same time will cause actuation of the signal devices at both the right and the left of the car and may be understood as a signal indicating a reduction in speed or that the operator desires to stop the car. When actuating either or both devices at night, the switches are operated so that the lamp or lamps of said device or devices are placed in circuit, and when the colored signal flaps or members are thrown upwardly and outwardly against the openings in the front and rear walls of the casings, the lamp in the top of the casing illuminates the entire interior of the latter, and as said signal flaps or members are constructed of celluloid or other colored translucent material, the signal is clearly exposed and visible from a considerable distance, and vehicles following and vehicles and persons in front may ascertain the course over which the automobile is to be driven.

My invention is susceptible to many changes in details of construction and may therefore be modified in various ways without departing from the spirit of the same or sacrificing any of the advantages thereof.

Having thus described my invention, what I claim is:—

1. A signaling device comprising a solenoid, a pair of actuating levers connected to the core of said solenoid and disposed in planes at opposite sides thereof, and a pair of signal members arranged one above the other, said actuating levers being adapted to move said signaling members simultaneously into signaling positions when said solenoid is energized.

2. A signaling device comprising a solenoid having a slidable core, a pair of elbow levers each having one of its ends pivotally connected to said core, a pair of actuating levers each having one of its ends pivotally connected to the opposite end of one of said elbow levers, and a pair of overlying pivoted signaling members against which the opposite ends of said actuating levers bear, said opposite ends of said actuating levers being adapted to separate said signaling members and move the same outwardly.

3. In a signaling device, the combination with a base, and a casing having openings in opposite walls, of a solenoid arranged between said opposite walls and having a slidable core, a pair of elbow levers each having one of its ends connected to said core, a pair of actuating levers pivotally connected between their ends to said base and arranged at opposite sides of a plane passing vertically through the axis of said solenoid, said actuating levers each having an inwardly-directed arm at one of its ends pivotally connected to the opposite end of one of said elbow levers and having its other end bent upwardly and inwardly, and a pair of curved signaling members pivotally connected to said base at opposite sides of said solenoid and normally overlying one another above said solenoid, the inner ends of said actuating levers being adapted to force said signaling members upwardly and outwardly when said solenoid is energized to expose said members through the openings of said casing.

4. In a signaling device, the combination with a base and a casing having openings in opposite walls, of a lamp within said casing, a solenoid secured to said base between said opposite walls and having a sliding core therein, a pair of pivoted overlapping signaling members normally invisible through said openings, means interposed between said sliding core and said signaling members to cause the latter to swing and be exposed through said openings, and electrical means to energize said solenoid and light said lamp, or to energize said solenoid only.

5. In a signaling device, the combination with a casing having openings in its front and rear wall, a pair of pivoted overlapping signaling members within said casing normally invisible through said openings and adapted to be swung upwardly so as to be exposed through said openings, a solenoid within said casing in a plane between the pivots of said signaling members, and means interposed between the outer or free end of the core of said solenoid and said signaling members to cause the latter to swing into exposed positions.

6. In a signaling device, the combination with a pair of curved overlapping translucent colored signaling members, a lamp spaced from said signaling members and arranged to have its light rays project therefrom outside of said signaling members, and means for moving said signaling members into positions whereby the light rays of said lamp are projected through said signaling members.

7. In a signaling device, the combination with a casing having openings in its front and rear wall, a lamp situated in a plane between and above said openings, a pair of curved pivotally secured signaling members normally overlapping one another and positioned beneath said lamp, and means for swinging each of said signaling members upwardly into a position between said lamp and one of said openings.

8. In a signaling device, the combination with a casing having openings in opposite walls, a pair of curved signaling members pivoted at their outer edges and having their inner portions overlapped, an electric device within said casing beneath said overlapping signaling members, and means between said electrical device and said signaling members for swinging the latter against the openings of said casing.

In testimony whereof I affix my signature.

EDWARD TRIMM.